United States Patent

[11] 3,539,206

| [72] | Inventors | Lyndle G. Gheen;<br>Paul J. Daniels, Eugene, Oregon |
|---|---|---|
| [21] | Appl. No. | 783,249 |
| [22] | Filed | Dec. 12, 1968 |
| [45] | Patented | Nov. 10, 1970 |
| [73] | Assignee | R. H. Pierce Manufacturing Company<br>Eugene, Oregon<br>a corporation of Oregon |

[54] IRRIGATION COUPLING
8 Claims, 4 Drawing Figs.

[52] U.S. Cl. .................................................. 285/5,
285/320, 423
[51] Int. Cl. ...................................................... F16l 55/00,
F16l 39/00
[50] Field of Search .......................................... 285/5, 6,
24, 320, 27

[56] References Cited
UNITED STATES PATENTS

| 2,510,477 | 6/1950 | Montgomery ............... | 285/5 |
|---|---|---|---|
| 3,312,487 | 4/1967 | McIntyre ..................... | 285/320X |

FOREIGN PATENTS

| 208,072 | 5/1957 | Australia ..................... | 285/5 |

Primary Examiner—Dave W. Arola
Attorney—Buckhorn, Blore, Klarquist and Sparkman

ABSTRACT: A polyvinyl pipe is secured and sealed to a coupling in the field by inserting a flexible polyurethane sleeve into an annular groove in a coupling with a keying pin in the coupling projecting into a keying slot in the sleeve. The pipe and sleeve are then bonded together by a solvent cement. The coupling includes a male member having a splining post projecting into a slot in a female member. A latching plate on the splining post engages a flange on the female member to connect the members for tension.

Patented Nov. 10, 1970
3,539,206
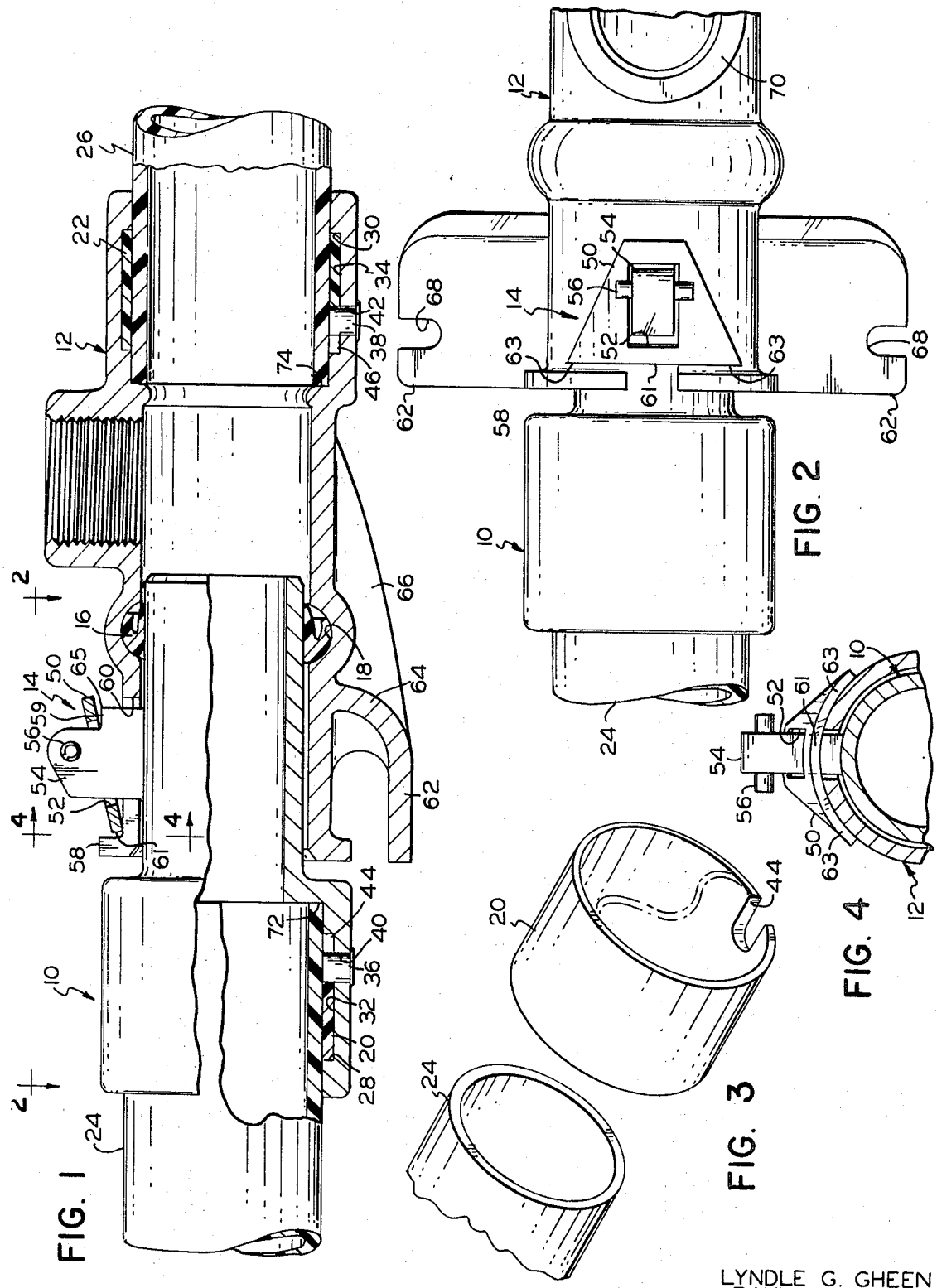
LYNDLE G. GHEEN
PAUL J. DANIELS
INVENTORS.
BY
BUCKHORN, BLORE, KLARQUIST & SPARKMAN
ATTORNEYS

IRRIGATION COUPLING

DESCRIPTION

This invention relates to an irrigation coupling, and more particularly to a quick detachable coupling.

An object of the invention is to provide a new and improved irrigation coupling.

A further object of the invention is to provide a new and improved irrigation coupling adapted to lock and key irrigation lines together.

The invention provides an irrigation coupling including a female coupling member having a splining slot extending therealong and extending laterally through the wall of the coupling member, a male coupling member having a post slidable in the slot and extending through the slot to the exterior of the female coupling member and a latch member carried by the post and serving to latch the members together.

In the drawings,

FIG. 1 is a fragmentary, vertical sectional view of a coupler structure forming one embodiment of the invention;

FIG. 2 is a fragmentary top plan view of the coupler structure of FIG. 1;

FIG. 3 is an exploded, perspective view of a portion of the coupler structure of FIG. 1; and FIG. 4 is a fragmentary vertical sectional view taken along line 4—4 of FIG. 1.

Referring now in detail to the drawings, there is shown therein a coupler structure forming one embodiment of the invention and including a male coupling member 10 and a female coupling member 12 secured together by a quickly operable latch mechanism 14. A seal 16 in an annular groove 18 seals the members 10 and 12 together, and resilient sealing sleeves 20 and 22 bonded to plastic pipes 24 and 26 are pressed by water pressure against annular flanges or rims 28 and 30 to form watertight seals with the members 10 and 12. The sleeves fit in annular grooves 32 and 34 in the members 10 and 12 sufficiently loosely to slide axially along the grooves 10 and 12 and press tightly against the flanges. Pins 36 and 38 fixed by riveting into holes 40 and 42 in the members project into the inner end portions of the grooves and into splining slots or notches 44 and 46 in the inner end portions of the sleeves. The ends of the pipes 24 and 26 respectively abut shoulders 72 and 74.

The latching mechanism 14 includes a latching plate 50 having a rectangular hole 52 fitting loosely on rectangular post 54 and is retained thereon by roll pin 56. The slot is longer than the width of the upper portion of the post and the post has an elevated shoulder 59 on which the plate 50 rests, the shoulder being spaced radially outwardly from the coupling member 12 so that the plate 50 tilts inwardly by gravity to rest on the member 12 behind a flange 58 on the end of the member 12. The shoulder 59 is spaced radially outwardly beyond the flange 58 so that the coupling member 10 can be slid freely into the coupling member 12. The shoulder 59 and the post form a pivot for the plate 50. The plate 50 is generally of the shape of a truncated triangle and forms a portion of a cylinder substantially equal in diameter to the external diameter of the adjacent portion of the member 12. Forward end portion 61 of the plate 61 is concavely arcuate so that end portions 63 are spaced the same distance from the flange 58 as the central portion of the portion 61.

A base 62 of the member 12 keeps the coupling structure upright and has slots 68 and a flange 64, and a web 66 reinforces the base. The slots 68 are adapted to receive bolts of a skid (not shown). The coupling member 12 has a threaded coupling sleeve portion 70. The slot 52 is longer than the width of the upper portion of the plate 54 but is shorter than the width of the upper portion of the plate plus the length of the shoulder 59 so that the plate 50 never slides over the shoulder. The portion of the plate 50 to the right of the slot 62, as viewed in FIG. 1, is longer than the length of the shoulder 59 so that when that end of the plate 50 is pressed by the finger of the user the plate engages corner 65 and is swung clockwise, as viewed in FIG. 1, so that its left-hand end is raised above the flange 58, and the members 10 and 12 may be pulled apart. As illustrated in FIG. 2, the portion of the plate 50 to the left of the right-hand end of the slot 52 is heavier than the portion of the plate 50 to the right of the slot 52. This causes the plate to always tend to be biased counterclockwise as viewed in FIG. 1 so that its left-hand end is above the flange 58 to permit the member 10 to be inserted into the member 12 without manipulation of the plate 50. This biasing of the plate also causes the right-hand end of the plate to normally rest on the portion of the member 12 behind the flange 58 to securely latch the member 10 to the member 12. Thus, the plate 50 is a ratchet type latch permitting coupling without manipulation but requiring manual actuation for release.

We claim:

1. In an irrigation coupling:

a first sleevelike coupling member having a notchlike slot extending along the coupling member and extending laterally through the wall of the coupling member;

a second sleevelike coupling member adapted to be inserted into the first sleevelike coupling member and having a keying member adapted to enter the slot and key the members together;

latching means for securing the members together against relative longitudinal movement;

the latching means comprising a locking member mounted pivotally on the keying member;

the keying member including a post portion extending through the slot and positioned radially beyond the first sleevelike coupling member when the second sleevelike coupling member is in operative position extending into the first sleevelike coupling member;

the locking member being pivotally mounted on the post portion in a position outside the first sleevelike coupling member; and the first sleevelike coupling member having an exterior radially extending stop engageable by the locking member when the locking member is in a latching position and the locking member being pivotal from the latching position to a release position clearing the stop and said notchlike slot extending axially through said stop.

2. The irrigation coupling of claim 1 wherein the locking member is a pawl-like plate having a slot loosely receiving the post portion, mounting means retaining the locking member on the post portion.

3. The irrigation coupling of claim 2 wherein the mounting means comprises a notched portion in the post portion serving as a pivot for the locking member and a pin carried by the post portion radially outwardly from the locking member.

4. The irrigation coupling of claim 3 wherein the locking member is biased by gravity toward its latching position.

5. The irrigation coupling of claim 1 wherein the stop comprises a radial end flange on the first coupling member.

6. The irrigation coupling of claim 3 wherein the stop comprises a radial end flange on the first coupling member.

7. In an irrigation coupling:

a first sleevelike coupling member having a supporting base portion and also having an exterior radial flange at one end thereof;

the first coupling member also having a notchlike splining slot extending therealong from said one end through the flange and toward the other end thereof;

the first coupling member also having an interior annular groove positioned between the slot and said other end;

a sealing ring positioned in the groove;

a second sleevelike coupling member having a tubular end portion positioned at said one end and extending through the sealing ring;

the tubular end portion having a keying post extending outwardly through the slot and outwardly beyond the slot and beyond the flange;

the keying post having a pivot portion spaced outwardly from the first sleevelike coupling member; and a latching member pivotally mounted on the pivot portion between a locking position engaging the flange and a releasing position above the flange.

8. The irrigation coupling of claim 7 wherein the latching member comprises a truncated triangular plate having a slot loosely receiving and pivotal relative to the outer end portion of the projection, the projection having a notch pivotally receiving the smaller end portion of the plate to define the pivot portion, and a pin on the outer end portion of the projection for retaining the plate on the projection and permitting free pivotal movement of the plate and also radially outward movement of the plate when the second sleevelike coupling member is pulled out of the first sleevelike coupling member.